(12) United States Patent
Hong et al.

(10) Patent No.: US 11,324,978 B2
(45) Date of Patent: May 10, 2022

(54) FIRE-FIGHTING FLUID STORAGE APPARATUS OF BATTERY PACK

(71) Applicant: CONTEMPORARY AMPEREX TECHNOLOGY CO., LIMITED, Fujian (CN)

(72) Inventors: Jiarong Hong, Ningde (CN); Xiaoteng Huang, Ningde (CN); Wenli Wang, Ningde (CN); Yanhuo Xiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/358,959

(22) Filed: Jun. 25, 2021

(65) Prior Publication Data

US 2021/0316178 A1     Oct. 14, 2021

Related U.S. Application Data

(63) Continuation of application No. PCT/CN2019/076315, filed on Feb. 27, 2019.

(30) Foreign Application Priority Data

Dec. 28, 2018  (CN) .......................... 201822234086.0

(51) Int. Cl.
*A62C 35/02*     (2006.01)
*A62C 3/16*      (2006.01)
(Continued)

(52) U.S. Cl.
CPC ............... *A62C 3/16* (2013.01); *A62C 3/065* (2013.01); *A62C 35/023* (2013.01);
(Continued)

(58) Field of Classification Search
CPC ......... A62C 3/16; A62C 3/065; A62C 35/023; H01M 50/673; H01M 10/42; H01M 2200/00; H01M 2220/20; B60L 1/00
(Continued)

(56) References Cited

U.S. PATENT DOCUMENTS 4,194,569 A * 3/1980 Heath ...................... A62C 3/08
                                                    169/26
4,393,941 A * 7/1983 Stevens .................... A62C 3/04
                                                    169/70
(Continued)

FOREIGN PATENT DOCUMENTS

CN     101293130 A    10/2008
CN     102049117 A     5/2011
(Continued)

OTHER PUBLICATIONS

English translation of CN 108762330 by Google patents (Year: 2018).*
(Continued)

*Primary Examiner* — Chee-Chong Lee
(74) *Attorney, Agent, or Firm* — Scully Scott Murphy & Presser

(57) ABSTRACT

The present application is provided with a fluid storage apparatus of a battery pack, including: a box, where the box has an inner cavity; a partition member, where the partition member is located in the inner cavity of the box, and the partition member divides the box into a fluid storage portion and a gas storage portion. The fluid storage portion is used to store spraying liquid and the fluid storage portion has a fluid outlet; the gas storage portion is used to store gas and the gas storage portion has a fluid inlet. And the partition member is configured to move toward the fluid outlet under the action of compressed gas in the gas storage portion.

16 Claims, 3 Drawing Sheets

(51) Int. Cl.
*H01M 50/673* (2021.01)
*A62C 3/06* (2006.01)
*H01M 10/42* (2006.01)
*B60L 1/00* (2006.01)

(52) U.S. Cl.
CPC ......... *H01M 10/42* (2013.01); *H01M 50/673* (2021.01); *B60L 1/00* (2013.01); *H01M 2200/00* (2013.01); *H01M 2220/20* (2013.01)

(58) Field of Classification Search
USPC .......................................................... 169/9
See application file for complete search history.

(56) References Cited

U.S. PATENT DOCUMENTS

| | | | | |
|---|---|---|---|---|
| 4,700,894 A | * | 10/1987 | Grzych | A62C 31/02 239/555 |
| 4,779,683 A | * | 10/1988 | Enk | A62C 35/02 169/28 |
| 5,423,384 A | * | 6/1995 | Galbraith | A62C 35/023 149/21 |
| 5,660,236 A | * | 8/1997 | Sears | A62C 13/22 169/33 |
| 5,944,216 A | * | 8/1999 | Inaoka | B60K 15/073 220/562 |
| 9,016,600 B2 | | 4/2015 | Pearson et al. | |
| 2010/0090026 A1 | | 4/2010 | Pearson et al. | |

FOREIGN PATENT DOCUMENTS

| | | | | |
|---|---|---|---|---|
| CN | 104091904 A | | 10/2014 | |
| CN | 105344041 A | | 2/2016 | |
| CN | 105597252 A | | 5/2016 | |
| CN | 206566392 U | | 10/2017 | |
| CN | 108762330 | * | 11/2018 | ............. G05D 16/20 |
| CN | 109546203 | * | 3/2019 | ........ H01M 10/0525 |

OTHER PUBLICATIONS

English translation of CN 109546203 by Google patents (Year: 2019).*

International Search Report dated Aug. 26, 2019 issued in PCT/CN2019/076315.

* cited by examiner

FIRE-FIGHTING FLUID STORAGE APPARATUS OF BATTERY PACK

This application is a continuation of International Application No. PCT/CN2019/076315, filed on Feb. 27, 2019, which claims priority to Chinese Patent Application No. 201822234086.0, filed to the Chinese Patent Office on Dec. 28, 2018 and entitled "FIRE-FIGHTING FLUID STORAGE APPARATUS OF BATTERY PACK", the entire content of which is incorporated herein by reference.

TECHNICAL FIELD

The present application relates to the technical field of energy storage components, and in particular, to a fire-fighting fluid storage apparatus of a battery pack.

BACKGROUND

At present, safety accidents related to electric vehicles occur frequently, and one of the major factors causing these safety accidents is the auto-ignition of batteries. The battery includes a box body and a unit battery located inside the box body. When the unit battery undergoes a thermal failure, it releases a high-temperature heat flow. And it is easy to burn when the high-temperature flow comes in contact with air after leaking. The heat flow spreads to adjacent unit batteries will lead the battery pack to burn, which will bring serious harm to the safety of passengers and drivers.

Therefore, a current power battery is usually equipped with a fire-fighting spraying system. The fire-fighting spraying system includes a liquid storage apparatus and a gas storage apparatus, and spray is achieved by compressed gas in the gas storage apparatus driving the fire-fighting fluid in the liquid storage apparatus.

However, the above-mentioned fire-fighting spraying system has disadvantages such as occupying large space and inconvenient spatial arrangement.

SUMMARY

In view of this, an embodiment of the present application is provided with a fire-fighting fluid storage apparatus for a battery pack to solve the problems of occupying larger space and inconvenient spatial arrangement of the liquid storage apparatus and gas storage apparatus in the prior art.

Embodiments of the present application is provided with a fire-fighting fluid storage apparatus of a battery pack, including:
- a box, wherein the box has an inner cavity;
- a partition member, wherein the partition member is located in the inner cavity of the box, and the box is divided into a liquid storage portion and a gas storage portion by the partition member;
- wherein the liquid storage portion is provided with a fluid outlet, and the gas storage portion is provided with a fluid inlet,
- a fire-fighting fluid in the liquid storage portion is configured to be driven by the partition member to move toward the fluid outlet under the action of compressed gas in the gas storage portion.

Preferably, the partition member includes a partition plate, the partition plate is configured to be moved relative to an inner wall of the box under the action of the compressed gas in the gas storage portion, to push the fire-fighting fluid in the liquid storage portion to move toward the fluid outlet.

Preferably, a slide sealing member is arranged between an outer peripheral wall of the partition plate and the inner wall of the box.

Preferably, the partition member includes a diaphragm, the diaphragm is configured to be expanded under the action of the compressed gas in the gas storage portion, to push the fire-fighting fluid in the liquid storage portion to move toward the fluid outlet.

Preferably, the liquid storage portion and the gas storage portion are distributed along a lengthwise direction L of the box, and the partition member is configured to be moved along the lengthwise direction L of the box.

Preferably, the liquid storage portion and the gas storage portion are distributed along a height direction H of the box, and the liquid storage portion is located below the gas storage portion;

and the partition member is configured to be moved along the height direction H of the box.

Preferably, the fluid inlet is arranged at a box top wall or a box side wall of the box, and the fluid outlet is arranged at a liquid storage bottom wall of the liquid storage portion;

along the height direction H of the box, a distance between the fluid inlet and a bottom of the box is greater than a distance between the fluid outlet and the bottom of the box.

Preferably, the liquid storage bottom wall of the liquid storage portion includes a first planar portion and an inclined portion, and the inclined portion is inclined downward relative to the first planar portion;

the fluid outlet is arranged at a liquid storage side wall of the liquid storage portion, and a center line Y of the fluid outlet is located below the first planar portion.

Preferably, the liquid storage bottom wall of the liquid storage portion further includes a second planar portion, the second planar portion is located under the first planar portion, and the first planar portion is connected to the second planar portion by the inclined portion.

Preferably, a mounting portion is provided and connected to an outer wall of the box, and the mounting portion extends downward below the box;

the mounting portion is provided with a first mounting hole and a second mounting hole;

and between the first mounting hole and the second mounting hole, one is a round hole, and the other is an oblong hole.

Preferably, a height of the mounting portion is greater than a height of the inclined portion.

At the same time, embodiments of the present application is provided with a fire-fighting fluid storage apparatus of a battery pack, including:
- a box, wherein the box has an inner cavity, and the box is provided with a fluid inlet and a fluid outlet;
- the fluid inlet is located above the fluid outlet;
- and the inner cavity of the box is used to store fire-fighting fluid and compressed gas, and the fire-fighting fluid in the inner cavity of the box is configured to be discharged from the fluid outlet under the action of the compressed gas.

In the present application, when the fire-fighting fluid in the liquid storage portion is not discharged from the fluid outlet, the acting force of the fire-fighting fluid in the liquid storage portion on the partition member is balanced with the acting force of the compressed gas in the gas storage portion on the partition member, so that the partition member can stay at the position. When the fire-fighting fluid in the liquid storage portion is discharged from the fluid outlet, the thrust of the fire-fighting fluid in the liquid storage portion on the partition member is reduced, then under the action of the compressed gas in the gas storage portion, the fire-fighting fluid in the liquid storage portion can be driven to move toward the direction of the fluid outlet by the partition member, so that the fire-fighting fluid is discharged from the fluid outlet, thereby realizing the function of driving the fire-fighting fluid with the compressed gas. In the meantime, the fire-fighting fluid storage apparatus also has advantages such as simple structure and small space occupation.

When the fire-fighting fluid storage apparatus is used in the spraying system of the battery pack, the fire-fighting fluid in the liquid storage portion is spraying liquid, and the fluid outlet of the liquid storage portion communicates with a spraying pipeline of the spraying system. When the unit battery in the battery pack is experiencing a thermal runway and a heat flow is ejecting from an explosion-proof valve, the spraying pipeline at this position may form an opening under the action of the heat flow, so that the spraying liquid in the spraying pipeline discharges from the opening. Then part of the spraying liquid in the liquid storage portion enters the spraying pipeline such that an amount of spraying liquid in the liquid storage portion is reduced, and the balance is broken. The compressed gas in the gas storage portion drives the partition member, and then drives the fire-fighting fluid in the liquid storage portion to enter the spraying pipeline and be sprayed from the opening of the spraying pipeline to prevent heat diffusion.

Therefore, in the spraying system of the battery pack, the gas storage portion of the fire-fighting fluid storage apparatus functions as a driving apparatus of the spraying liquid, and there is no need to install additional monitoring apparatuses and control apparatuses. That is, the spraying system does not need to be equipped with sensors. The spray may be implemented merely with the relationship among the components in the spraying system, and may respond fast with a simple structure.

BRIEF DESCRIPTION OF DRAWINGS

To describe the technical solutions in the embodiments of the present application more clearly, the following briefly describes the accompanying drawings required for the embodiments. Apparently, the accompanying drawings in the following description show merely some embodiments of the present application, and persons of ordinary skill in the art may still derive other drawings from these accompanying drawings without creative efforts.

REFERENCE SIGNS

Figure 1:
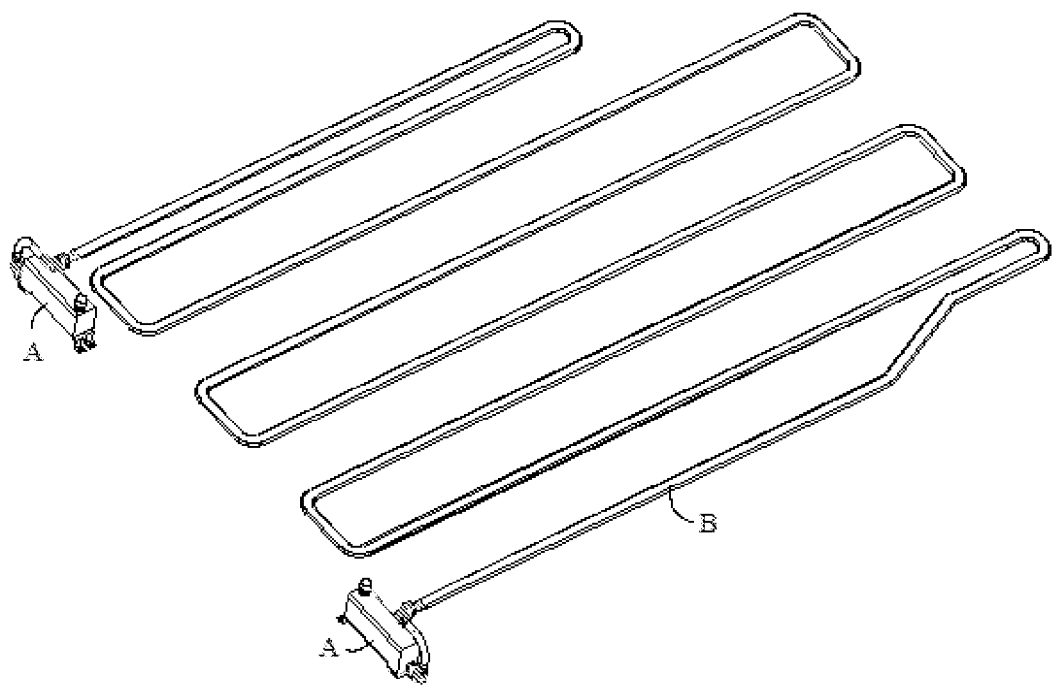
FIG. 1 is a schematic structural diagram of a spraying system of a battery pack provided in an embodiment of the present application.

A—Fire-fighting fluid storage apparatus;
1—Box;
11—Liquid storage portion;
111—Fluid outlet;
112—Liquid storage bottom wall;
112a—First planar portion;
112b—Second planar portion;
112c—Inclined portion;
113—Liquid storage side wall;
12—Gas storage portion;
121—Fluid inlet;
13—Partition member;
14—Box top wall;
15—Box side wall;
2—Mounting portion;
21—First mounting hole;
22—Second mounting hole;
Y—Center line;
B—Spraying pipeline.

DESCRIPTION OF EMBODIMENTS

To better understand the technical solutions in the present application, the following describes embodiments of the present application with reference to the accompanying drawings.

It should be understood that the described embodiments are merely part but not all of the embodiments of the present application. All other embodiments obtained by a person of ordinary skill in the art based on the embodiments in the present application without creative efforts shall fall within the protection scope of the present application.

The terms used in the embodiments of the present application is merely for the purpose of describing specific embodiments and is not intended to limit the present application. The singular forms "one", "said" and "the" used in the embodiments of the present application and the appended claims are also intended to include plural forms unless the context clearly indicates other meanings.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this text generally indicates that the associated objects before and after the character are in an "or" relationship.

It should be understood that the directional terms such as "up", "down", "left", and "right" described in the embodiments of the present application are described as seen from the angles shown in the accompanying drawings, and should not be understood as a limitation to the embodiments of the present application In addition, in the context, it should be understood that, when it is mentions an element connecting to "upper" or "lower" of another element, the element can not only directly connect to the "upper" or "lower" of another element, but can connect to the "upper" or "lower" of another element by intermediate element.

A battery pack includes a box and a unit battery, wherein the unit battery is provided with an explosion-proof valve. When the unit battery is experiencing thermal runway, a high-temperature and high-pressure heat flow is generated therein. The explosion-proof valve is used to discharge the heat flow to lower the risk of explosion of the unit battery. However, when the heat flow is discharged from the explosion-proof valve, the high temperature heat flow may cause an adjacent unit battery to burn. In order to reduce the risk of burning the adjacent unit batteries when a certain unit battery is experiencing the thermal runway, in the present application, a spraying system is added to the battery pack to reduce heat flow diffusion and improve the safety of the battery pack.

The spraying system includes a spraying pipeline and a liquid storage apparatus, where spraying pipeline communicates with the liquid storage apparatus. When the unit battery is experiencing the thermal runway, the spraying pipeline may form an opening under the action of the heat flow such that the spraying liquid in the spraying pipeline discharges from the opening, thereby the spraying liquid in the liquid storage portion enters the spraying pipeline and discharges from the opening. For the liquid storage apparatus, a liquid storage apparatus communicating with the gas storage apparatus may be provided, where compressed gas is stored in the gas storage apparatus. The compressed gas can drive the spraying liquid in the liquid storage apparatus into the spraying pipeline, where the liquid storage apparatus and the gas storage apparatus are arranged separately. In the present application, a fire-fighting fluid storage apparatus is provided, which may integrate the liquid storage apparatus and the gas storage apparatus, and has the advantages of small space occupation and simple structure. The specific structure is described below.

Figure 2:
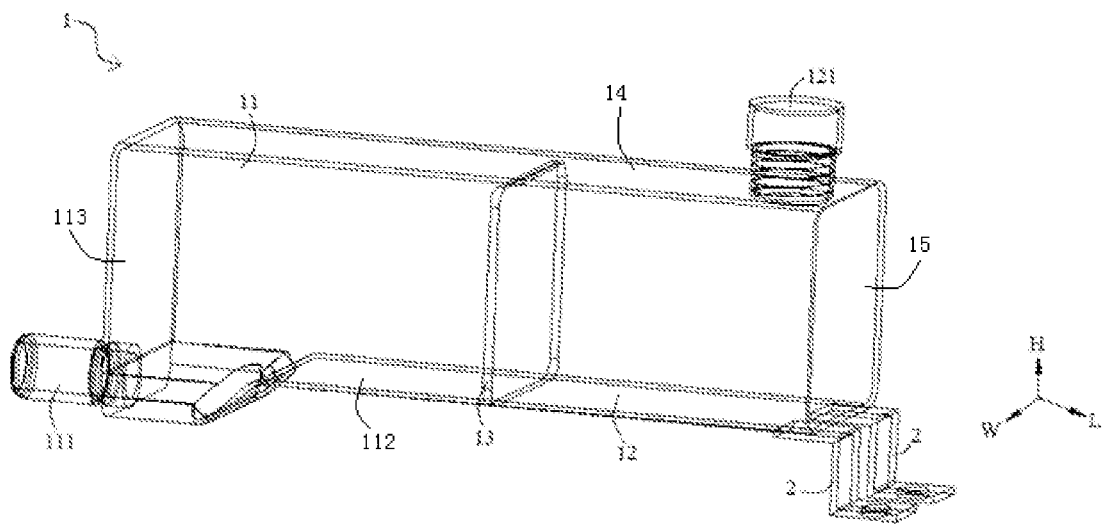
FIG. 2 is a perspective view of a fire-fighting fluid storage apparatus of FIG. 1 in the first embodiment.
Figure 3:
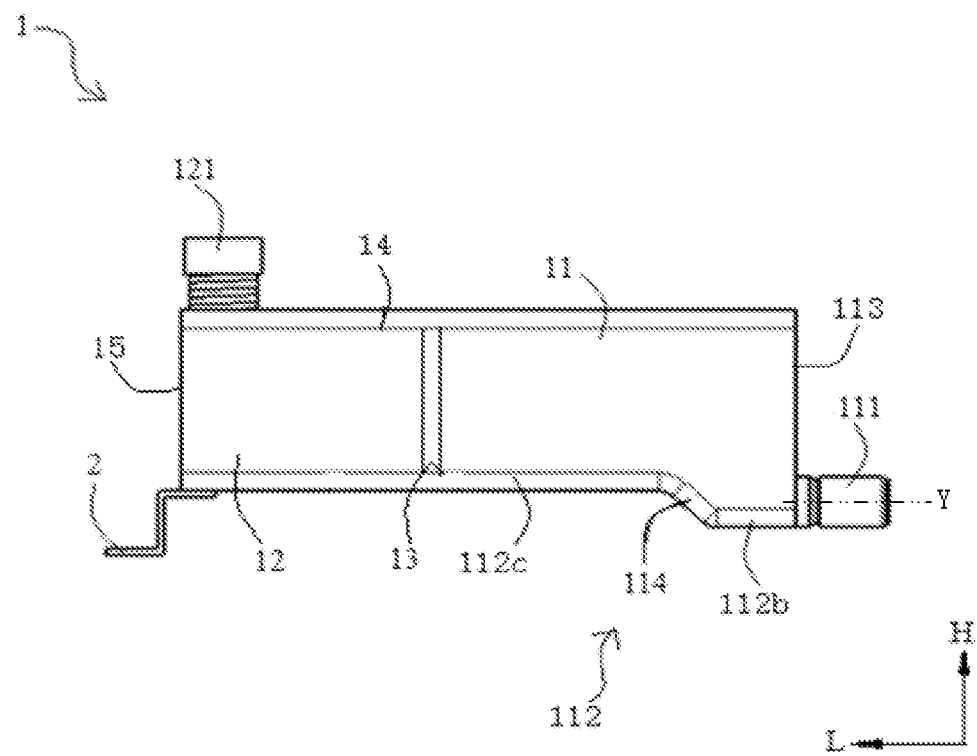
FIG. 3 is a front view of FIG. 2.
Figure 4:
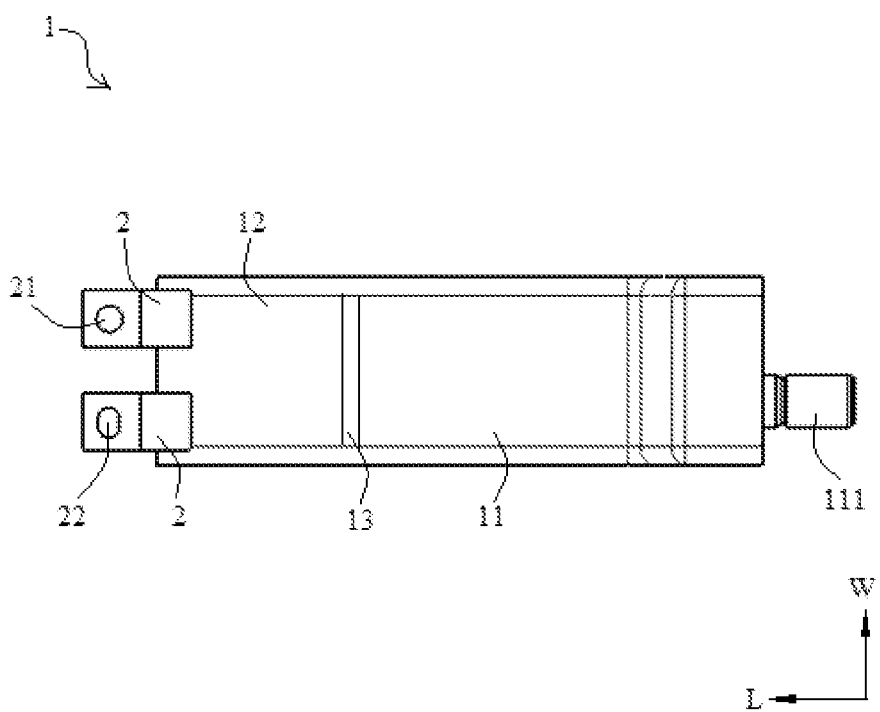
FIG. 4 is a bottom view of FIG. 2.
Figure 5:
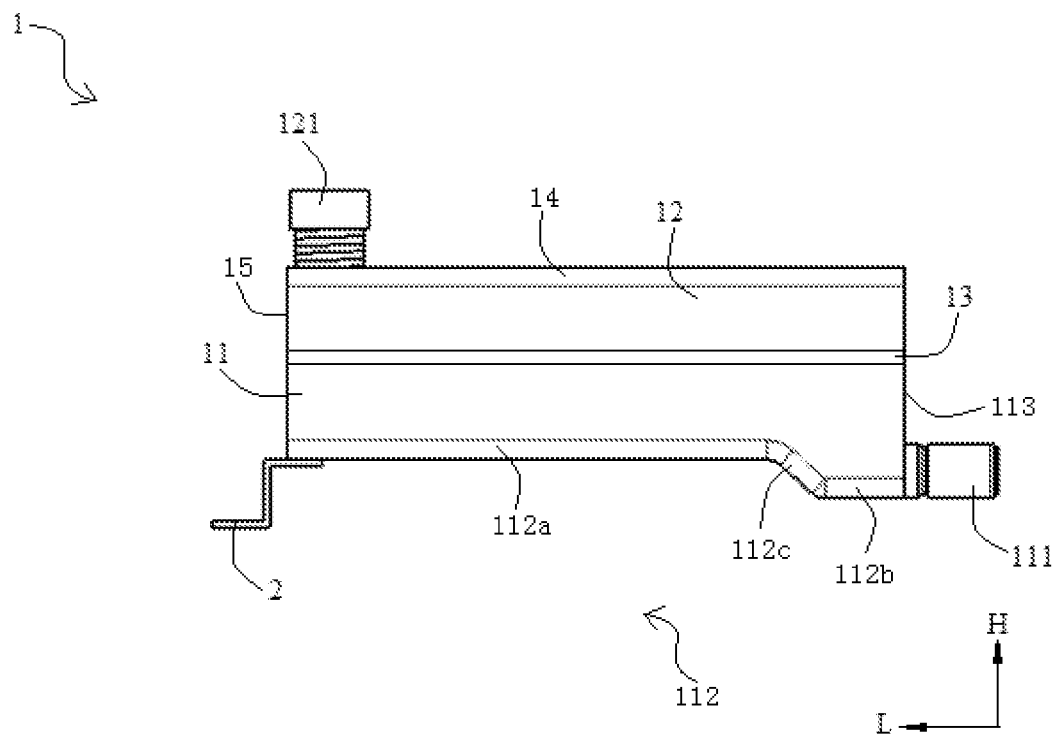
FIG. 5 is a schematic structural diagram of the fire-fighting fluid storage apparatus of FIG. 1 in the second embodiment.
Figure 6:
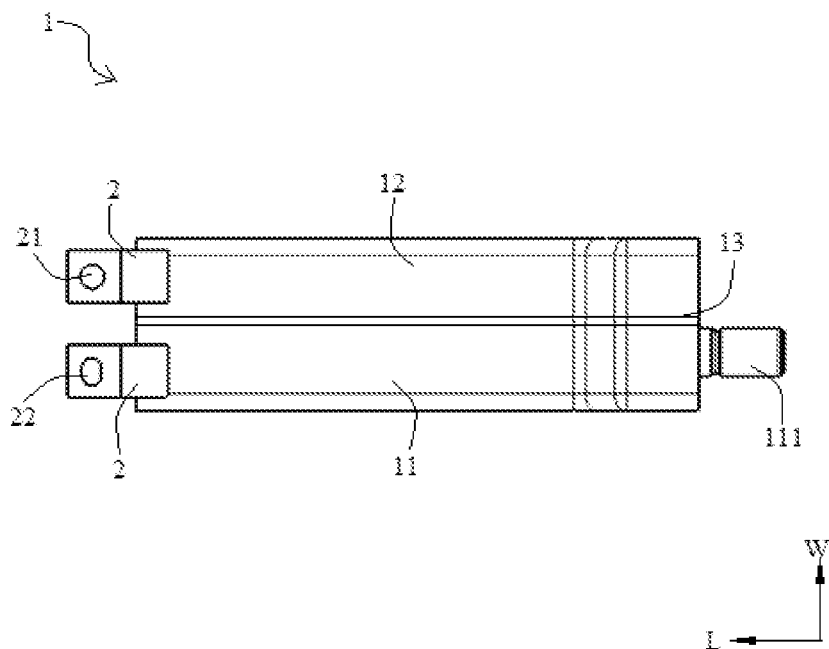
FIG. 6 is a schematic structural diagram of the fire-fighting fluid storage apparatus of FIG. 1 in the third embodiment.

With reference to FIGS. 1-6, FIG. 1 is a schematic structural diagram of a spraying system of a battery pack provided in an embodiment of the present application; FIG. 2 is a perspective view of a fire-fighting fluid storage apparatus of FIG. 1 in the first embodiment; FIG. 3 is a front view of FIG. 2; FIG. 4 is a bottom view of FIG. 2; FIG. 5 is a schematic structural diagram of the fire-fighting fluid storage apparatus of FIG. 1 in the second embodiment; and FIG. 6 is a schematic structural diagram of the fire-fighting fluid storage apparatus of FIG. 1 in the third embodiment.

An embodiment of the present application is provided with a fire-fighting fluid storage apparatus A. The fire-fighting fluid storage apparatus A is used in a battery pack, where the battery pack includes a housing, wherein the housing has an inner cavity; and a unit battery, disposed in the cavity of the housing.

Specifically, the battery pack further includes a spraying system, where the spraying system includes a spraying pipeline B and the fire-fighting fluid storage apparatus A, and the spraying pipeline B communicates with the fire-fighting fluid storage apparatus A.

More specifically, as shown in FIGS. 2-6, the fire-fighting fluid storage apparatus A includes: a box 1, where the box 1 has an inner cavity, and the inner cavity is used for accommodating fluid (in the present application, the inner cavity of the box 1 is used to accommodate compressed gas and fire-fighting fluid); a partition member 13, where the partition member 13 is located in the inner cavity of the box 1. The partition member 13 divides the box 1 into a liquid storage portion 11 and a gas storage portion 12. The partition member 13 divides the inner cavity of the box 1 into two cavities, between the two cavities, one is used to store fire-fighting fluid, and the other is used to store compressed gas. The cavity storing fire-fighting fluid is formed in the liquid storage portion 11 of the fire-fighting fluid storage apparatus A, and the cavity storing compressed gas is formed in the gas storage portion 12 of the fire-fighting fluid storage apparatus A.

The fire-fighting fluid in the present application includes fluorinated liquid. After being sprayed from the spraying pipeline 11, the fluorinated liquid can chemically react with the heat flow in the unit battery 2 so as to absorb heat and prevent heat diffusion. In addition, the compressed gas in the present application may be incombustible gas such as helium, nitrogen, argon, and like.

In the embodiment shown in FIGS. 2-6, the cavity for storing fluid and the cavity for storing compressed gas above are both enclosed by the inner wall of the box 1 and the partition member 13. Meanwhile, the liquid storage portion 11 has a fluid outlet 111, and the gas storage portion 12 has a fluid inlet 121. The partition member 13 can drive the fire-fighting fluid in the liquid storage portion 11 to move toward the fluid outlet 111 under the action of the compressed gas in the gas storage portion 12.

In the present application, when the fire-fighting fluid in the liquid storage portion 11 is not discharged from the fluid outlet 111, the acting force of the fire-fighting fluid in the liquid storage portion 11 on the partition member 13 is balanced with the acting force of the compressed gas in the gas storage portion 12 on the partition member 13, so that the partition member 13 can stay at the position. When the fire-fighting fluid in the liquid storage portion 11 is discharged from the fluid outlet 111, the thrust of the fire-fighting fluid in the liquid storage portion 11 on the partition member 13 is reduced, then under the action of the compressed gas in the gas storage portion 12, the fire-fighting fluid in the liquid storage portion 11 can be driven to move toward the direction of the fluid outlet 111 by the partition member 13 so that the fire-fighting fluid is discharged from the fluid outlet 111, thereby realizing the function of driving the fire-fighting fluid with the compressed gas. In the meantime, the fire-fighting fluid storage apparatus A also has advantages such as simple structure and small space occupation.

When the fire-fighting fluid storage apparatus A is used in the spraying system of the battery pack, the fire-fighting fluid in the liquid storage portion 11 is spraying liquid, and the fluid outlet 111 of the liquid storage portion 11 communicates with a spraying pipeline of the spraying system. When the unit battery in the battery pack is experiencing a thermal runaway and a heat flow is ejecting from the explosion-proof valve, under the action of the heat flow, the spraying pipeline at this position may form an opening, and then the spraying liquid in the spraying pipeline discharges from the opening such that part of the spraying liquid in the liquid storage portion 11 enters the spraying pipeline, thereby an amount of spraying liquid in the liquid storage portion 11 is reduced, and the balance is broken. The compressed gas in the gas storage portion 12 drives the partition member 13, thereby driving the fire-fighting fluid in the liquid storage portion 11 to enter the spraying pipeline and be sprayed from the opening of the spraying pipeline to prevent heat diffusion.

Therefore, in the spraying system of the battery pack, the gas storage portion 12 of the fire-fighting fluid storage apparatus A is used as a driving apparatus of the spraying liquid, and there is no need to install additional monitoring apparatuses and control apparatuses, that is, the spraying system does not need to be equipped with sensors. The spray may be implemented only with the relationship among the components of the spraying system, of which the response speed is fast and the structure is simple.

In addition, the fire-fighting fluid storage apparatus A in the present application can be used in the spraying system of the battery pack, and other occasions.

Specifically, in the first embodiment, as shown in FIGS. 2-6, the partition member 13 includes a partition plate. The partition plate is disposed in the inner cavity of the box 1 and can move relative to the inner wall of the box 1 under the action of the compressed gas in the gas storage portion 12, to push the fire-fighting fluid in the liquid storage portion 11 to move toward the fluid outlet 111.

In the embodiment, when the unit battery of the battery pack is experiencing the thermal runway and the fire-fighting fluid is discharged from the opening of the spraying pipeline, the fire-fighting fluid in the liquid storage portion 11 enters the spraying pipeline through the fluid outlet 111. The thrust of the fire-fighting fluid in the liquid storage portion 11 on the partition member 13 is reduced, and under the action of the compressed gas in the gas storage portion 12, the fire-fighting fluid in the liquid storage portion 11 can push the partition member 13 to move toward the liquid storage portion 11, thereby reducing the volume of the liquid storage portion 11 and increasing the volume of the gas storage portion 12. During the movement of the partition member 13, the fluid in the liquid storage portion 11 can continue to be discharged from the fluid outlet 111. Therefore, in the embodiment, the partition member 13 is used to discharge the fire-fighting fluid in the liquid storage portion 11.

More specifically, in the embodiment, a slide sealing member is arranged between an outer peripheral wall of the partition plate and the inner wall of the box 1. The slide sealing member is provided so that the partition member 13 can move relative to the inner wall of the box 1. And the slide sealing member can function as a sealing, which reduces the risk of the liquid and/or compressed gas flowing between the outer peripheral wall of the partition member 13 and the inner wall of the box 1, thereby improving the sensitivity of movement of the partition member 13.

For example, the above-mentioned slide sealing member may be a pack sealing or the like.

On the other hand, as the first embodiment shown in FIGS. 2-4, in the box 1, the liquid storage portion 11 and the gas storage portion 12 are distributed along the lengthwise direction L of the box 1, and the partition member 13 can move along the lengthwise direction L of the box 1. During the movement of the partition member 13, the volume of the liquid storage portion 11 can be reduced and the volume of the gas storage portion 12 can be increased, so under the thrust of the partition member 13, the fluid in the liquid storage portion 11 can be discharged from the fluid outlet 111. At the same time, as the volume of the gas storage portion 12 increases, the thrust of the compressed gas on the partition member 13 decreases. In order to further increase the speed and flow rate of the fluid discharged from the fluid outlet 111, the compressed gas may be introduced continually to the fluid outlet 121 in the gas storage portion 12 so that the fluid discharged from the fluid outlet 111 can have a higher speed and flow rate, thereby satisfying the requirements of the battery pack.

As the second embodiment shown in FIG. 5, the liquid storage portion 11 and the gas storage portion 12 are distributed along the height direction H of the box 1, and the liquid storage portion 11 is located below the gas storage portion 12. At the same time, the member 13 can move along the height direction H of the box 1. Specifically, in the solution of the present embodiment, the partition member 13 can move downward along the inner wall of the box 1 so as to reduce the volume of the liquid storage portion 11 and increase the volume of the gas storage portion 12 during the movement of the partition member 13, thereby pushing the fluid to be discharged from the fluid outlet 111. In the meantime, the compressed gas can be introduced continually through the fluid inlet 121.

In the above three embodiments, the partition member 13 has a plate-like structure. When the partition member 13 is arranged in the inner cavity of the box 1, the inner cavity of the liquid storage portion 11 and the inner cavity of the gas storage portion 12 have structures with regular shapes. It is sure that the partition member 13 may also have other shapes. For example, the partition member 13 may be a multi-bent structure, and when it is located inside of the inner cavity of the box 1, the structure of both the inner cavity of the liquid storage portion 11 and the inner cavity of the gas storage portion 12 are irregular, and the distribution of the two is not limited.

In addition, in the above three embodiments, the box 1 is a structure with the same cross-sectional area (such as a rectangular parallel pipelined structure), so the partition member 13 is not limited during the movement. When the cross-sectional area of the box 1 changes (for example, the box 1 is a spherical structure), the partition member 13 needs to adapt to the change of the cross-sectional area of the box 1 during the movement. For example, the partition member 13 may be a retractable structure.

In the second embodiment, the partition member 13 includes a diaphragm. The diaphragm can expand under the action of the compressed gas in the gas storage portion 12, to push the fire-fighting fluid in the liquid storage portion 11 to move toward the fluid outlet 111.

In the embodiment, when the unit battery of the battery pack is experiencing the thermal runway and the fire-fighting fluid is discharged from the opening of the spraying pipeline, the fire-fighting fluid in the liquid storage portion 11 enters the spraying pipeline through the fluid outlet 111, and the acting force of the fire-fighting fluid of the liquid storage portion 11 on the diaphragm decreases. The diaphragm expands under the action of the compressed gas in the gas storage portion 12, so that the fire-fighting fluid in the liquid storage portion 11 can be pushed to flow toward the direction of the fluid outlet 111. Therefore, in the embodiment, the fire-fighting fluid in the liquid storage portion 11 is discharged by the expansion of the partition member 13.

The above-mentioned diaphragm may be an Ethylene Propylene Diene Monomer (EPDM) diaphragm.

On the other hand, in the above embodiments, in order to facilitate the discharge of the fire-fighting fluid from the fluid outlet 111, the fluid outlet 111 should be located below the fluid inlet 121. Specifically, the first arrangement of the fluid inlet 121 and the fluid outlet 111 is (not shown in the figure): the fluid inlet 121 arranged at the box top wall 14 or the box side wall 15 of the box 1; the fluid outlet 111 arranged at the liquid storage bottom wall 112 of the liquid storage portion 11 in the box 1.

In the present embodiment, when the fluid outlet 111 is provided in the liquid storage bottom wall 112 of the liquid storage portion 11, after the opening is formed in the spraying pipeline, the spraying liquid can enter the spraying pipeline from the liquid storage portion 11 under the action of gravity such that the flow rate of the spraying liquid sprayed from the opening of the spraying pipeline becomes large in a short time, and the spray effect can be improved.

As shown in FIGS. 2-6, the second arrangement of the fluid inlet 121 and the fluid outlet 111 is: the fluid inlet 121 provided in the box top wall 14 or the box side wall 15 of the box 1. At the same time, as shown in FIGS. 3 and 5, the liquid storage bottom wall 112 of the liquid storage portion 11 includes a first planar portion 112*a* and an inclined portion 112*c*, where the inclined portion 112*c* is inclined downward relative to the first flat portion 112*a*. Therefore, for the liquid storage portion 11, the downwardly inclined portion 112*c* forms a concave structure, and the concave structure is located below other positions of the box 1. In this case, the fluid outlet 111 is provided in the liquid storage side wall 113 of the liquid storage portion 11 and the center line Y of the fluid outlet 111 is located below the first planar portion 112a. That is, the fluid outlet 111 corresponds to the above-mentioned concave structure.

In the present embodiment, after the inclined portion 112c is provided at the bottom of the liquid storage portion 11 and the concave structure is formed, the fluid in the liquid storage portion 11 has a tendency to flow toward the concave structure under the action of gravity. When the fluid outlet 111 is provided at the concave structure, it can facilitate the discharge of fluid from the fluid outlet 111, and more importantly, reduce the amount of spraying liquid remaining in the liquid storage portion 11, thereby improving the spray effect and the utilization rate of the spraying liquid.

Therefore, in the present embodiment, after the inclined portion 112c is provided, the discharge of fluid from the fluid outlet 111 is facilitated and the residual amount of liquid is reduced. At the same time, there is no need to provide the fluid outlet 111 at the bottom of the liquid storage portion 11, so that a bottom surface of the box 1 can be used as an installation surface, which improves installation flexibility and reduces installation difficulty.

Further, as shown in FIGS. 3 and 5, the bottom wall of the liquid storage portion 11 further includes a second planar portion 112b, where the second planar portion 112b is located below the first planar portion 112a, and the first planar portion 112a and the second planar portion 112b are connected by the inclined portion 112c. The second planar portion 112b is also connected with the liquid storage side wall 113 of the liquid storage portion 11. Therefore, the second planar portion 112b is located below other portions of the box 1.

At the same time, a mounting portion 2 is connected to an outer side of the box 1, and the mounting portion 2 can be used for mounting with the housing of the battery pack. As shown in FIG. 2, the mounting portion 2 extends downward the box 1.

In the present embodiment, since the second planar portion 112b and the mounting portion 2 both extend downward relative to the box 1, therefore the second planar portion 112b and the mounting portion 2 can be used as a mounting structure of the fire-fighting fluid storage apparatus A, where the second planar portion 112b can support an external equipment, the mounting portion 2 can be bolted to the external equipment, so that reliability of the installation of the fire-fighting fluid storage apparatus A can be improved by the auxiliary support of the second planar portion 112b.

Specifically, the second planar portion 112b may be flush with the installation plane of the installation portion 2 or not, which can be arranged according to the specific installation environment.

At the same time, a height of the above mounting portion 2 is greater than a height of the inclined portion 112c so as to ensure that the fire-fighting fluid can be completely discharged, reducing the storage of a large amount of fire-fighting fluid. Therefore unnecessary weight can be reduced.

Specifically, as shown in FIG. 4, the mounting portion 2 has a first mounting hole 21 and a second mounting hole 22. The two mounting holes are used to connect external equipment with bolts or pins. Between the first mounting hole 21 and the second mounting hole 22, one is a round hole and the other is an oblong hole, where the oblong hole is used to trim the position of the fire-fighting fluid storage apparatus A, or to adapt to errors generated in the manufacturing and assembly process, and the round hole is used to secure to the external equipment.

In addition, as shown in FIGS. 3 and 5, the mounting portion 2 is provided at one side of the fluid inlet 121 to provide support by the mounting portion 2, to withstand the relatively large pressure at the fluid inlet 121.

At the same time, an embodiment of the present application also provides another fire-fighting fluid storage apparatus A of the battery pack, which includes a box 1, where the box 1 is provided with a fluid inlet 121 and a fluid outlet 111. The fluid inlet 121 is located on the fluid outlet 111. The box 1 has an inner cavity, and the inner cavity of the box 1 is used to store fire-fighting fluid and gas. And the fire-fighting fluid in the inner cavity of the box 1 can be discharged from the fluid outlet 111 under the action of the compressed gas.

In the present embodiment, when the fire-fighting fluid storage apparatus A is working, a certain amount of fire-fighting fluid is firstly introduced through the fluid inlet 121. Normally, the fire-fighting fluid does not completely occupy the space in the inner cavity of the box 1. And then the compressed gas is introduced through the fluid inlet 121 so that the compressed gas in the inner cavity of the box 1 can reach a preset air pressure. When the fire-fighting fluid storage apparatus A is used in a battery pack and the unit battery in the battery pack is experiencing the thermal runway, the spraying pipeline opens, and the fire-fighting fluid in the spraying pipeline is discharged from the opening. At the same time, under the action of compressed gas pressure, the fire-fighting fluid in the inner cavity of the box 1 is pushed in to the spraying pipeline to achieve the spray.

The foregoing descriptions are merely example embodiments of the present application, but are not intended to limit the present application. Any modification, equivalent replacement, or improvement made without departing from the spirit and principle of the present application shall fall within the protection scope of the present application.

What is claimed is:

1. A fire-fighting fluid storage apparatus of a battery pack, comprising:
   a box, wherein the box has an inner cavity;
   a partition member, wherein the partition member is located in the inner cavity of the box, and the box is divided into a liquid storage portion and a gas storage portion by the partition member;
   wherein the liquid storage portion is provided with a fluid outlet, and the gas storage portion is provided with a fluid inlet,
   a fire-fighting fluid in the liquid storage portion is configured to be driven by the partition member to move toward the fluid outlet under the action of compressed gas in the gas storage portion;
   wherein the fluid outlet is configured to be located below the fluid inlet, a liquid storage bottom wall of the liquid storage portion comprises a first planar portion and an inclined portion, and the inclined portion is inclined downward relative to the first planar portion;
   the fluid outlet is arranged at a liquid storage side wall of the liquid storage portion, and a center line of the fluid outlet is located below the first planar portion.

2. The fire-fighting fluid storage apparatus according to claim 1, wherein the partition member comprises a partition plate, the partition plate is configured to be moved relative to an inner wall of the box under the action of the compressed gas in the gas storage portion, to push the fire-fighting fluid in the liquid storage portion to move toward the fluid outlet.

3. The fire-fighting fluid storage apparatus according to claim 2, wherein, a slide sealing member is arranged between an outer peripheral wall of the partition plate and the inner wall of the box, and the slide sealing member comprises a pack sealing.

4. The fire-fighting fluid storage apparatus according to claim 2, wherein the liquid storage portion and the gas storage portion are distributed along a lengthwise direction of the box, and the partition member is configured to be moved along the lengthwise direction of the box.

5. The fire-fighting fluid storage apparatus according to claim 2, wherein the liquid storage portion and the gas storage portion are distributed along a height direction of the box, and the liquid storage portion is located below the gas storage portion;

and the partition member is configured to be moved along the height direction of the box.

6. The fire-fighting fluid storage apparatus according to claim 1, wherein the partition member comprises a diaphragm, the diaphragm is configured to be expanded under the action of the compressed gas in the gas storage portion, to push the fire-fighting fluid in the liquid storage portion to move toward the fluid outlet.

7. The fire-fighting fluid storage apparatus according to claim 6, wherein the diaphragm is an Ethylene Propylene Diene Monomer (EPDM) diaphragm.

8. The fire-fighting fluid storage apparatus according to claim 1, wherein the fluid inlet is arranged at a box top wall or a box side wall of the box, and the fluid outlet is arranged at a liquid storage bottom wall of the liquid storage portion;

along the height direction of the box, a distance between the fluid inlet and a bottom of the box is greater than a distance between the fluid outlet and the bottom of the box.

9. The fire-fighting fluid storage apparatus according to claim 1, wherein the liquid storage bottom wall of the liquid storage portion further comprises a second planar portion, the second planar portion is located under the first planar portion, and the first planar portion is connected to the second planar portion by the inclined portion;

wherein the second planar portion is located below other portions of the box.

10. The fire-fighting fluid storage apparatus according to claim 9, wherein a mounting portion is provided and connected to an outer wall of the box, and the mounting portion extends downward below the box.

11. The fire-fighting fluid storage apparatus according to claim 10, wherein the mounting portion is provided with a first mounting hole and a second mounting hole;

and between the first mounting hole and the second mounting hole, one is a round hole, and the other is an oblong hole.

12. The fire-fighting fluid storage apparatus according to claim 10, wherein the mounting portion is provided at one side of the fluid inlet.

13. The fire-fighting fluid storage apparatus according to claim 10, wherein the second planar portion is configured to support an external equipment, the mounting portion is configured to be bolted to the external equipment.

14. The fire-fighting fluid storage apparatus according to claim 1, wherein the partition member is configured to a plate-like structure.

15. The fire-fighting fluid storage apparatus according to claim 1, wherein the partition member is configured to a retractable structure.

16. The fire-fighting fluid storage apparatus according to claim 1, wherein the fire-fighting fluid includes fluorinated liquid.

* * * * *